(12) United States Patent
Jensen et al.

(10) Patent No.: US 12,514,571 B2
(45) Date of Patent: Jan. 6, 2026

(54) BIOPSY APPARATUS

(71) Applicant: Bard Peripheral Vascular, Inc., Franklin Lakes, NJ (US)

(72) Inventors: Angela Jensen, Phoenix, AZ (US); Chad Van Liere, Phoenix, AZ (US)

(73) Assignee: Bard Peripheral Vascular, Inc., Franklin Lakes, NJ (US)

( * ) Notice: Subject to any disclaimer, the term of this patent is extended or adjusted under 35 U.S.C. 154(b) by 576 days.

(21) Appl. No.: 17/997,564

(22) PCT Filed: May 4, 2020

(86) PCT No.: PCT/US2020/031282
§ 371 (c)(1),
(2) Date: Oct. 31, 2022

(87) PCT Pub. No.: WO2021/225569
PCT Pub. Date: Nov. 11, 2021

(65) Prior Publication Data
US 2023/0233194 A1    Jul. 27, 2023

(51) Int. Cl.
*A61B 10/02* (2006.01)
(52) U.S. Cl.
CPC .. *A61B 10/0275* (2013.01); *A61B 2010/0208* (2013.01)
(58) Field of Classification Search
None
See application file for complete search history.

(56) References Cited

U.S. PATENT DOCUMENTS

| | | |
|---|---|---|
| 4,266,555 A | 5/1981 | Jamshidi |
| 4,815,476 A | 3/1989 | Clossick |

(Continued)

FOREIGN PATENT DOCUMENTS

| | | |
|---|---|---|
| JP | 2004033753 A | 2/2004 |
| WO | 9915079 A1 | 4/1999 |

(Continued)

OTHER PUBLICATIONS

International Search Report and Written Opinion dated Feb. 1, 2021, in International Application No. PCT/US2020/031282.

(Continued)

*Primary Examiner* — Etsub D Berhanu
(74) *Attorney, Agent, or Firm* — Dinsmore & Shohl LLP (57) ABSTRACT

A biopsy apparatus includes a cannula assembly having a cannula hub and a cutting cannula. A stylet assembly has a stylet hub and a stylet. The stylet is coaxial with the cutting cannula. An operator mechanism is configured to effect axial movement of the stylet hub and the cannula hub. The operator mechanism has a head portion configured to releasably engage the stylet hub and an arm member configured to releasably engage the cannula hub. The stylet hub is configured to be rotationally movable between an engaged position and a disengaged position, wherein in the engaged position the stylet hub is releasably connected to the head portion of the operator mechanism, and in the disengaged position, the stylet hub is disconnected from the head portion of the operator mechanism to facilitate axial movement of the stylet assembly in a proximal direction independent of the operator mechanism.

21 Claims, 8 Drawing Sheets

(56) References Cited

U.S. PATENT DOCUMENTS

| | | |
|---|---|---|
| 4,881,551 A | 11/1989 | Taylor |
| 5,313,958 A | 5/1994 | Bauer |
| 5,331,972 A | 7/1994 | Wadhwani et al. |
| 5,651,372 A | 7/1997 | Caillouette |
| D403,063 S | 12/1998 | Brandhorst et al. |
| 6,149,607 A | 11/2000 | Simpson et al. |
| 6,450,973 B1 | 9/2002 | Murphy |
| D478,987 S | 8/2003 | Groenke et al. |
| 6,620,111 B2 | 9/2003 | Stephens et al. |
| 6,875,183 B2 | 4/2005 | Cervi |
| 7,018,343 B2 | 3/2006 | Plishka |
| 7,806,835 B2 | 10/2010 | Hibner et al. |
| 7,867,173 B2 | 1/2011 | Hibner et al. |
| 7,914,463 B2 | 3/2011 | Tarter et al. |
| 8,075,495 B2 | 12/2011 | Andreyko et al. |
| 8,235,913 B2 | 8/2012 | Hibner et al. |
| 8,282,573 B2 | 10/2012 | Shabaz et al. |
| 8,366,635 B2 | 2/2013 | Parihar et al. |
| 8,480,595 B2 | 7/2013 | Speeg et al. |
| 8,529,468 B2 | 9/2013 | Hoffa et al. |
| 8,622,926 B2 | 1/2014 | Hibner |
| 9,060,759 B2 | 6/2015 | Williams et al. |
| 9,301,736 B2 | 4/2016 | Rusnak |
| 9,326,755 B2 | 5/2016 | Fiebig et al. |
| 9,386,963 B2 | 7/2016 | Ryan et al. |
| RE46,135 E | 9/2016 | Hibner |
| 9,439,631 B2 | 9/2016 | Heske et al. |
| 9,585,639 B2 | 3/2017 | Swick et al. |
| 9,833,222 B2 | 12/2017 | Fiebig |
| 9,968,338 B2 * | 5/2018 | Shabaz .............. A61B 10/0266 |
| 2003/0208136 A1 * | 11/2003 | Mark ................ A61B 10/0275 |
| | | 600/564 |
| 2005/0124914 A1 * | 6/2005 | Dicarlo .............. A61B 10/0275 |
| | | 606/167 |
| 2006/0276747 A1 * | 12/2006 | Moos ................... A61B 10/025 |
| | | 604/117 |
| 2007/0010843 A1 * | 1/2007 | Green ................ A61B 17/3421 |
| | | 606/167 |
| 2007/0208271 A1 * | 9/2007 | Voegele ............. A61B 10/0275 |
| | | 600/564 |
| 2010/0010294 A1 | 1/2010 | Conlon et al. |
| 2010/0174210 A1 | 7/2010 | Han et al. |
| 2010/0298737 A1 | 11/2010 | Koehler |
| 2011/0098596 A1 | 4/2011 | Ozturk et al. |
| 2012/0179065 A1 * | 7/2012 | Ferree ................ A61B 10/0275 |
| | | 600/567 |
| 2012/0253230 A1 * | 10/2012 | Williams ........... A61B 10/0275 |
| | | 600/567 |
| 2012/0283563 A1 | 11/2012 | Moore et al. |
| 2014/0046304 A1 | 2/2014 | May et al. |
| 2017/0164934 A1 | 6/2017 | Hartley et al. |
| 2019/0374210 A1 | 12/2019 | Nock |

FOREIGN PATENT DOCUMENTS

| | | |
|---|---|---|
| WO | 0154574 A1 | 8/2001 |
| WO | 2007009901 A1 | 1/2007 |
| WO | 2014081812 A1 | 5/2014 |
| WO | 2018071530 A1 | 4/2018 |

OTHER PUBLICATIONS

JP Office Action dated Mar. 25, 2024 pertaining to JP 2022-566632 filed Nov. 1, 2022.

* cited by examiner

BIOPSY APPARATUS

CROSS-REFERENCE TO RELATED APPLICATIONS

This application is a U.S. National Phase of International Application No. PCT/US2020/031282, entitled "Biopsy Apparatus" and filed May 4, 2020, which is incorporated herein by reference in its entirety.

TECHNICAL FIELD

The present invention relates to a device for performing a biopsy, and, more particularly, to a biopsy apparatus operable in either of a single insertion single sample (SISS) biopsy mode or in a single insertion multiple sample (SIMS) biopsy mode.

BACKGROUND ART

The Bard® Mission™ Disposable Core Biopsy Instrument available from BD/C. R. Bard, Inc. is a single insertion single sample (SISS) biopsy device configured as a fully mechanical assembly. The SISS core biopsy device under the Mission brand includes a handle, an operator, an inner stylet, and an outer cutting cannula. The inner stylet has a distal end portion that includes a sample notch. The operator is movable relative to a handle, wherein a rearward (proximal) movement of the operator moves both the inner stylet and the outer cutting cannula to a rearward position to cock the outer cutting cannula. When armed, the outer cutting cannula is latched in the rearward position and a cannula firing spring is compressed, so as to achieve an armed state. The operator is then slid forward (distally), which slides the stylet in a distal direction relative to the cutting cannula to expose a sample notch of the stylet beyond the distal end of the outer cutting cannula. A further forward movement of the operator fires, i.e., releases, the cutting cannula firing spring from the armed state to propel the outer cutting cannula forward to move over the sample notch of the inner stylet, so as to sever any tissue in the sample notch of the inner stylet.

What is needed in the art is a biopsy apparatus that, for example, is fully mechanical, and which is capable of being operated in either of a single insertion single sample (SISS) biopsy mode or in a single insertion multiple sample (SIMS) biopsy mode.

SUMMARY OF INVENTION

The present invention provides, for example, a biopsy apparatus that is fully mechanical, and which is capable of being operated in either of a single insertion single sample (SISS) biopsy mode or in a single insertion multiple sample (SIMS) biopsy mode.

The invention in one form is directed to a biopsy apparatus that includes a housing, a cannula assembly, a stylet assembly, a firing mechanism, and an operator mechanism. The housing has a cavity and is configured to define a longitudinal axis. The cannula assembly is movably coupled to the housing. The cannula assembly has a cannula hub affixed to a cutting cannula. The cutting cannula has a lumen arranged on the longitudinal axis. The stylet assembly is movably coupled to the housing. The stylet assembly has a stylet hub and a stylet. The stylet is coaxial with the cutting cannula. The stylet has a proximal portion and a distal portion. The proximal portion is affixed to the stylet hub. The distal portion has a distal tip and a sample notch proximal to the distal tip. The stylet hub is configured to be axially and rotationally movable relative to the longitudinal axis. The firing mechanism has a latch and a firing spring. The firing spring and the cannula hub are positioned in the cavity of the housing. The latch is configured to engage the cannula hub to hold the cutting cannula in a first axial position. The operator mechanism is configured to effect axial movement of the stylet hub and the cannula hub. The operator mechanism has a head portion and an arm member, wherein the arm member extends distally from the head portion. The head portion is configured to releasably engage the stylet hub and the arm member is configured to releasably engage the cannula hub. The stylet hub is configured to be rotationally movable between an engaged position and a disengaged position, wherein in the engaged position the stylet hub is releasably connected to the head portion of the operator mechanism, and when the stylet hub is in the disengaged position, the stylet hub is disconnected from the head portion of the operator mechanism to facilitate axial movement of the stylet assembly in a proximal direction independent of the operator mechanism.

The invention in another form is directed to a biopsy apparatus that includes a housing having a sample access window. A sample removal finger is connected to the housing. The sample removal finger is configured to extend in a cantilever manner from the housing in the sample access window. The sample removal finger has a free end. A cannula assembly is movably coupled to the housing. The cannula assembly has a cannula hub affixed to a cutting cannula. The cutting cannula has a sample access port and a distal cutting edge. The cutting cannula defines a longitudinal axis. The cutting cannula is positioned to distally extend from the housing. The cannula assembly is configured to axially transition between a first axial position and a second axial position. A stylet assembly is movably coupled to the housing. The stylet assembly is configured to axially transition between a retracted position, an extended position, and a sample retrieval position. The stylet assembly has a stylet hub affixed to a stylet. The stylet is coaxial with the cutting cannula. The stylet has a distal tip and a sample notch proximal to the distal tip. The stylet is positioned wherein the free end of the sample removal finger extends through the sample access port of the cutting cannula to contact an outer surface of the stylet. An operator mechanism is configured to effect axial movement of the stylet hub and the cannula hub. The operator mechanism has a head portion and an arm member, wherein the arm member extends distally from the head portion. The head portion is configured to releasably engage the stylet hub and the arm member is configured to releasably engage the cannula hub. The stylet hub is configured to be rotationally movable relative to the head portion of the operator mechanism between an engaged position and a disengaged position.

An advantage of the present invention is that the stylet assembly is releasably connectable with the operator mechanism of the biopsy apparatus, wherein the SIMS capability of the biopsy apparatus is achieved by mechanically disconnecting the stylet assembly from the operator mechanism to facilitate movement of the stylet assembly, e.g., initially in a proximal direction, independent from the operator mechanism and the cannula assembly.

BRIEF DESCRIPTION OF DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate at least one embodiment of the invention, and such exemplifications are not to be construed as limiting the scope of the invention in any manner.

DESCRIPTION OF EMBODIMENTS

Referring now to drawings, and more particularly to FIGS. 1-5, there is shown a biopsy apparatus 10 in accordance with present invention, wherein biopsy apparatus 10 may be operated in either of a single insertion single sample mode (SISS) biopsy mode or in a single insertion multiple sample (SIMS) biopsy mode.

Biopsy apparatus 10 includes a housing 12, a cannula assembly 14, a stylet assembly 16, a firing mechanism 18 (FIGS. 4 and 5), and an operator mechanism 20. In accordance with an aspect of the present invention, stylet assembly 16 is releasably connectable with operator mechanism 20 by a connection mechanism 22, wherein the SIMS capability of biopsy apparatus 10 is achieved by mechanically disconnecting stylet assembly 16 from operator mechanism 20 to facilitate movement of stylet assembly 16, e.g., initially in a proximal direction 26, independent from operator mechanism 20 and cannula assembly 14.

Figure 4:
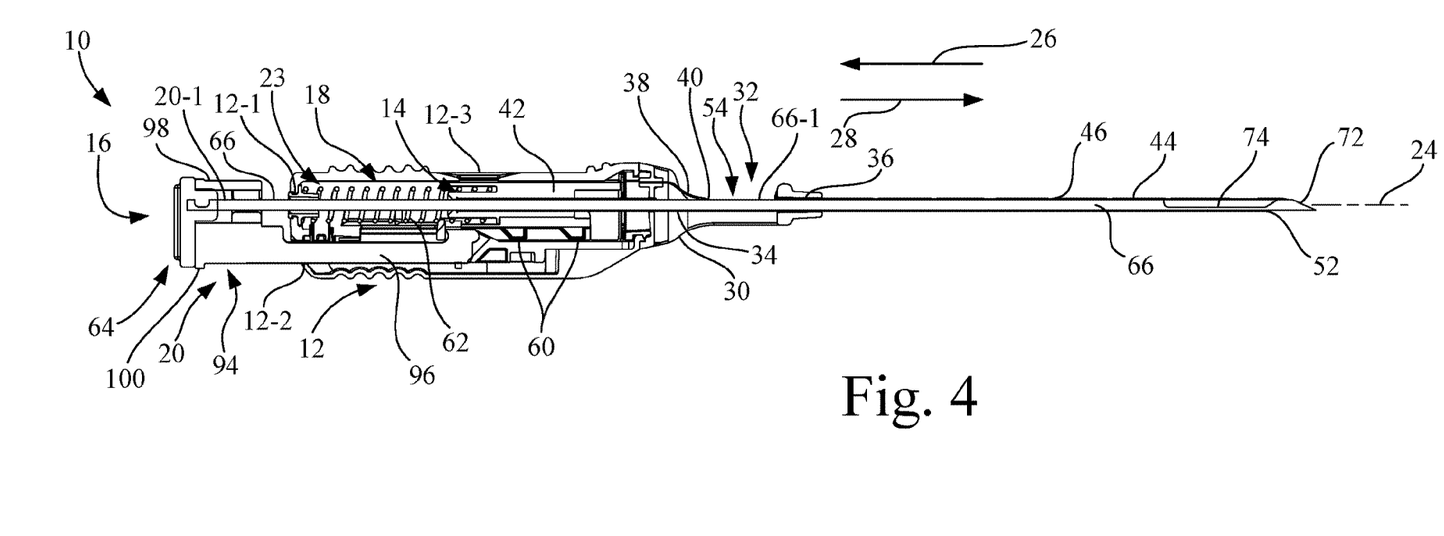
FIG. 4 is a section view of the biopsy apparatus of FIG. 1 taken along line 4-4 of FIG. 1.
Figure 5:
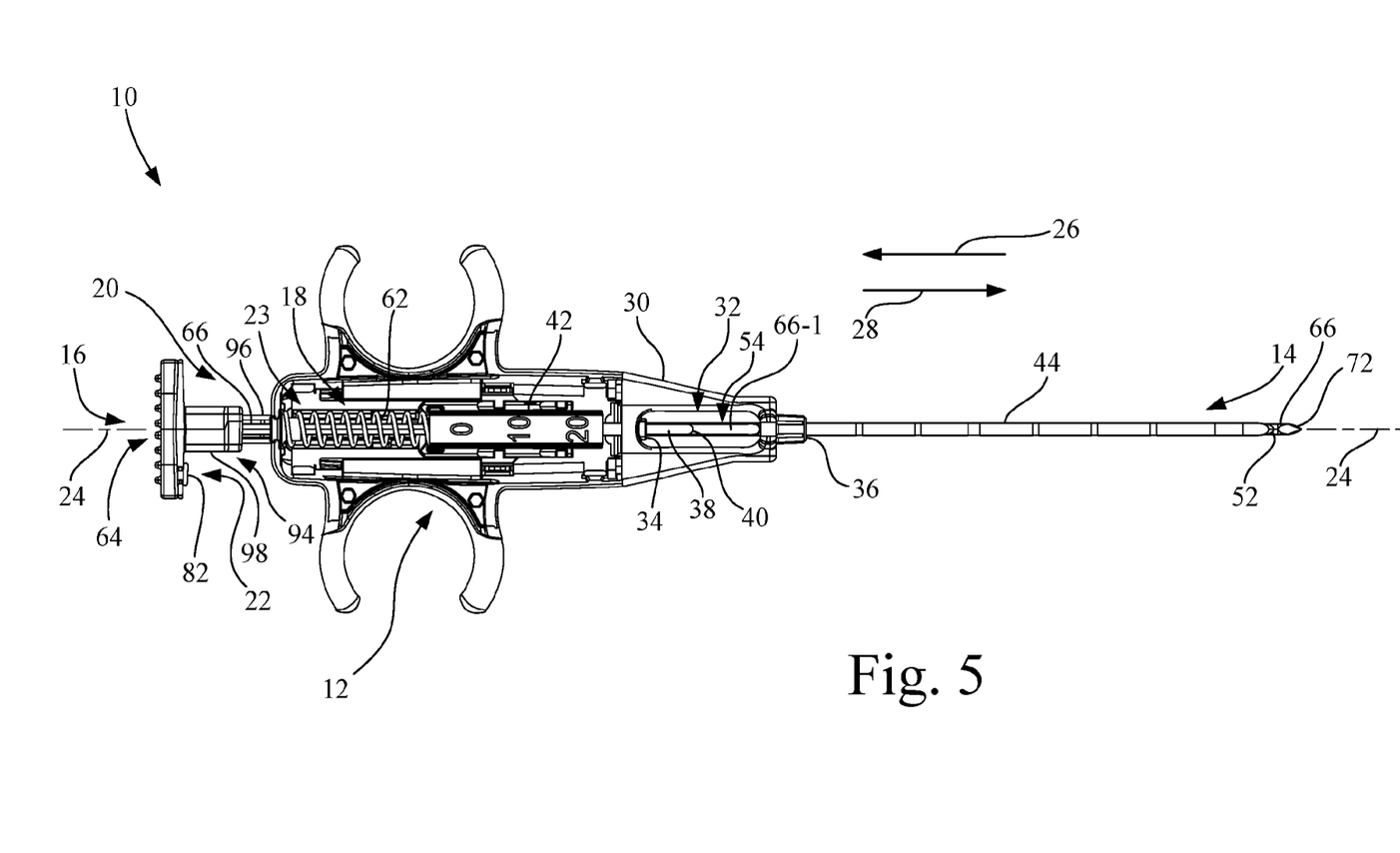
FIG. 5 is a top view of the biopsy apparatus of FIG. 1, with an upper portion of the housing removed to expose a firing mechanism and the cannula hub of the cannula assembly.

Referring to FIGS. 4 and 5, housing 12 has and defines a cavity 23 that contains firing mechanism 18. Also, housing 12 defines a longitudinal axis 24, and slidably carries cannula assembly 14 and stylet assembly 16 to facilitate slidable axial movement of cannula assembly 14 and stylet assembly 16 along longitudinal axis 24 in each of a proximal direction 26 and a distal direction 28.

Housing 12 includes a first proximal aperture 12-1 and a second proximal aperture 12-2. First proximal aperture 12-1 lies on longitudinal axis 24, and is sized and shaped to slidably receive a portion, e.g., a stylet, of stylet assembly 16. Second proximal aperture 12-2 of housing 12 is sized and shaped to slidably receive a portion, e.g., an arm, of operator mechanism 20. In the present embodiment, second proximal aperture 12-2 is radially offset from first proximal aperture 12-1 and from longitudinal axis 24, and a portion of operator mechanism 20 is slidably movable in second proximal aperture 12-2 substantially parallel to longitudinal axis 24.

Referring to FIGS. 1-5, housing 12 includes a distal nose portion 30. Distal nose portion 30 of housing 12 includes a sample access window 32, a proximal axial opening 34, and a distal axial opening 36. Each of proximal axial opening 34 (e.g., a cylindrical opening) and distal axial opening 36 (e.g., a cylindrical opening) are arranged on longitudinal axis 24, with distal axial opening 36 being distally spaced along longitudinal axis 24 from proximal axial opening 34. In addition, first proximal aperture 12-1 (see FIG. 4; e.g., a cylindrical aperture) of housing 12 is aligned with, and axially spaced from, each of proximal axial opening 34 and distal axial opening 36 on longitudinal axis 24. In the present embodiment, sample access window 32 is located in distal nose portion 30 of housing 12 and axially separates proximal axial opening 34 from distal axial opening 36 along longitudinal axis 24.

Positioned within sample access window 32 of housing 12 is a sample removal finger 38. Sample removal finger 38 is connected to housing 12 and distally extends in a cantilever manner from distal nose portion 30 of housing 12 in sample access window 32. In the present embodiment, sample removal finger 38 is an elongate member, e.g., bowed or curved along its length, and has a free end 40.

Cannula assembly 14 is movably coupled to housing 12. Referring particularly to FIG. 4, cannula assembly 14 includes a cannula hub 42 that is affixed, e.g., by overmolding, press fit and/or adhesive, to a cutting cannula 44. It may be considered that a location of cutting cannula 44 in housing 12 and the longitudinal extent of cutting cannula 44 defines longitudinal axis 24.

Referring also to FIG. 5, cannula hub 42 includes cutting length indicia, e.g., cutting length indicia "0", "10", and "20", wherein cutting length indicia "0" represents a fully extended position of cannula assembly 14 of 0 millimeters (mm), cutting length indicia "10" represents a retraction distance of cannula assembly 14 of 10 mm, and cutting length indicia "20" represents a retraction distance of cannula assembly 14 of 20 mm. Cannula hub 42 is contained within cavity 23, and may be slidably coupled, e.g., by a rail arrangement, to housing 12. Cutting cannula 44 is slidably disposed in, and distally extends through, proximal axial opening 34 and distal axial opening 36 of distal nose portion 30 of housing 12. Cutting cannula 44 is positioned to distally extend from distal nose portion 30 of housing 12 along longitudinal axis 24.

Figure 2:
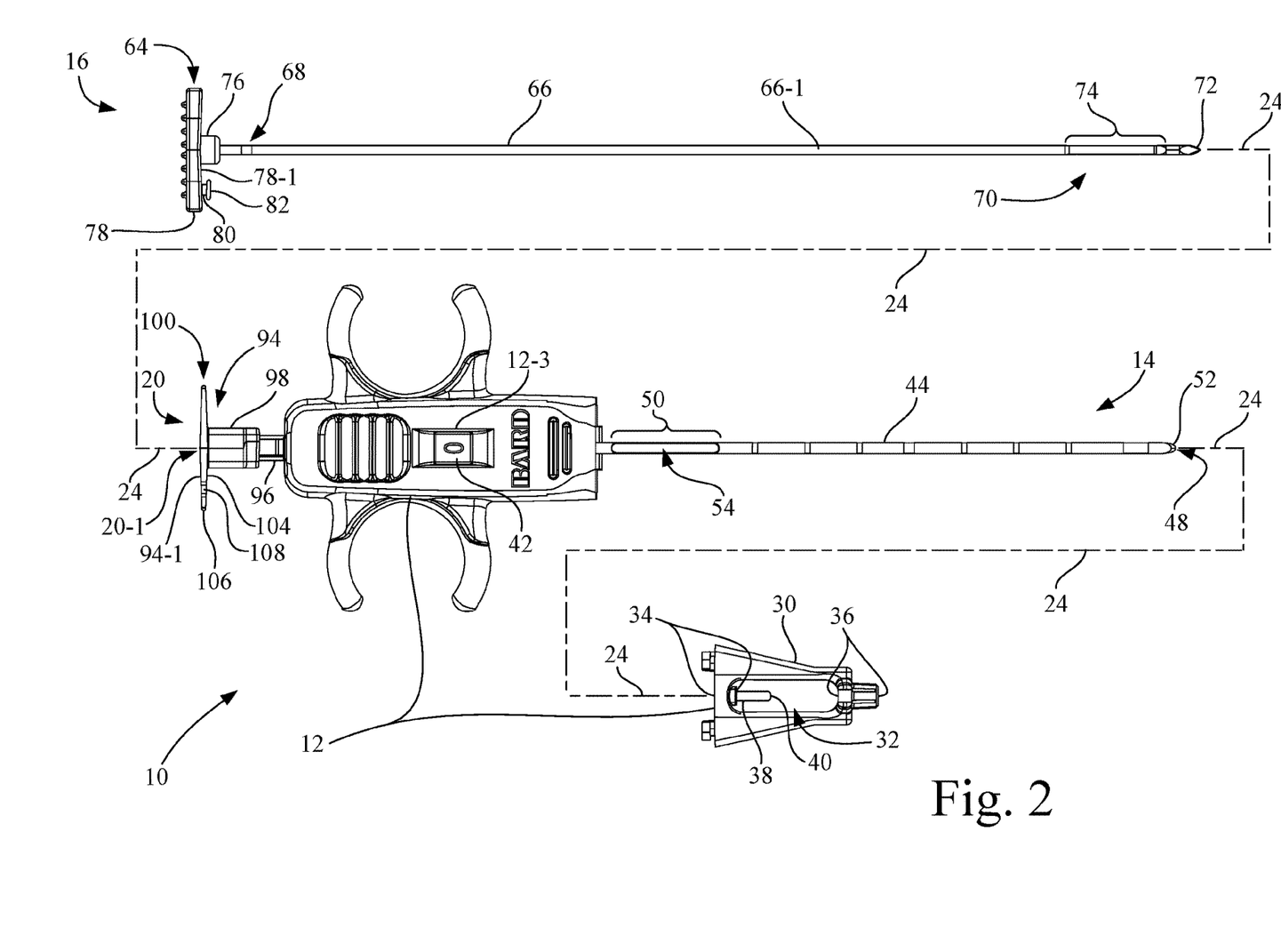
FIG. 2 is an exploded view of the biopsy apparatus of FIG. 1.
Figure 3:
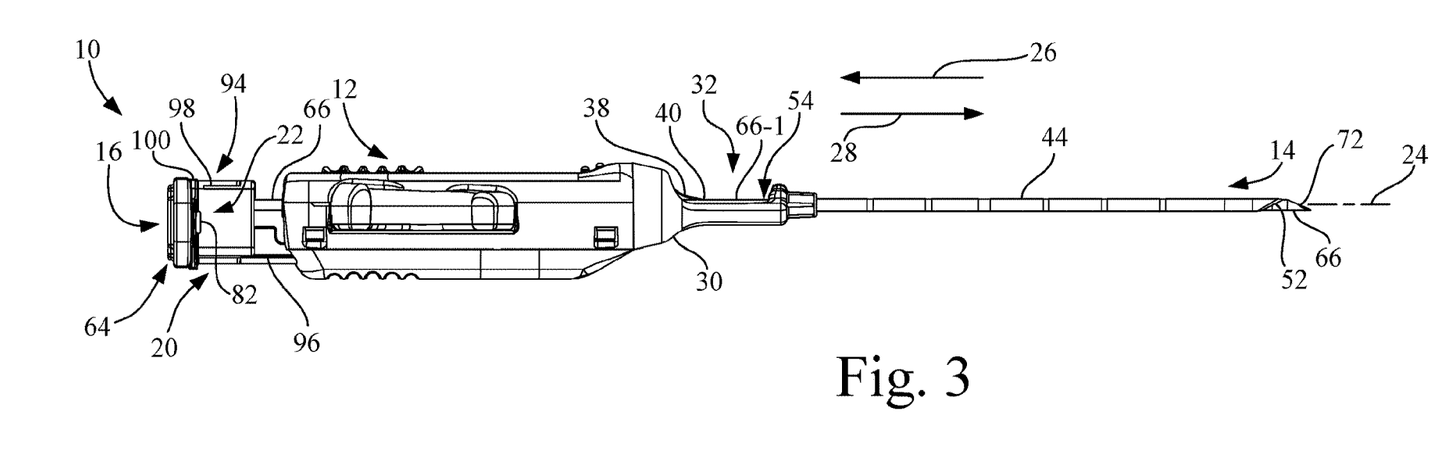
FIG. 3 is a side view of the biopsy apparatus of FIG. 1.

Referring to FIGS. 2 and 4, cutting cannula 44 includes a cannula wall 46 (FIG. 4), a lumen 48 (FIG. 2), a cannula portion 50, and a distal cutting edge 52. Cannula portion 50 is located distal to cannula hub 42, and may be a central portion of cutting cannula 44 located between cannula hub 42 and distal cutting edge 52. Cannula portion 50 has a sample access port 54 that radially extends through cannula wall 46 and is in fluid communication with lumen 48 of cutting cannula.

Figure 6:
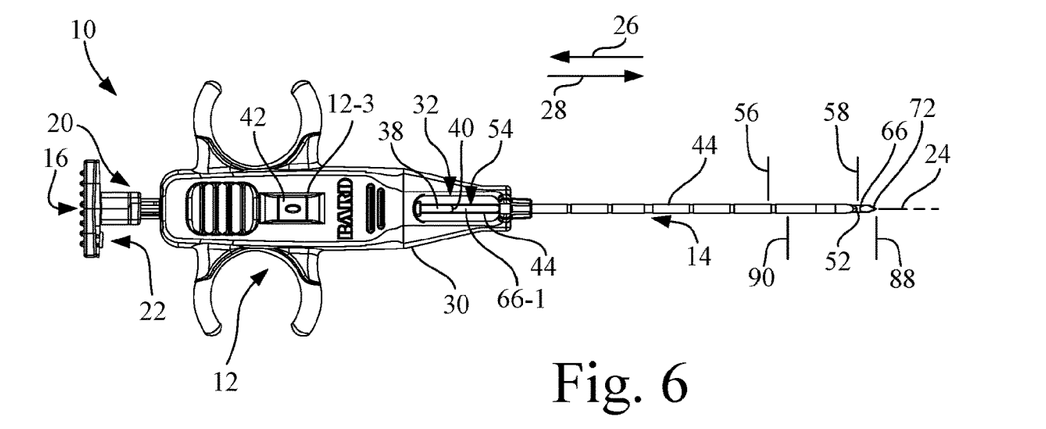
FIG. 6 is a top view of the biopsy apparatus of FIG. 1 with each of the stylet assembly and the cannula assembly in its respective fully extended position, representing a "fired" or de-primed, state of the biopsy apparatus.
Figure 7:
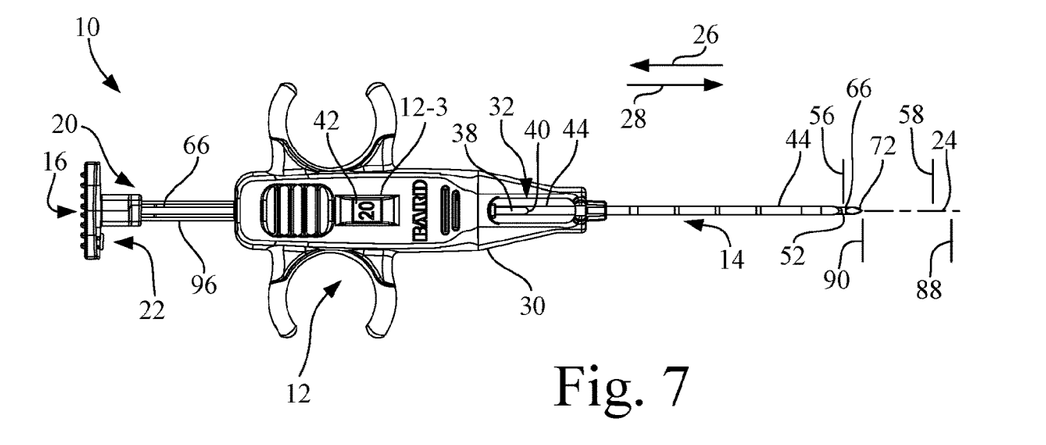
FIG. 7 is a top view of the biopsy apparatus of FIG. 1 with each of the stylet assembly and the cannula assembly in its respective retracted position, representing a "armed", i.e., primed, state of the biopsy apparatus.
Figure 8:
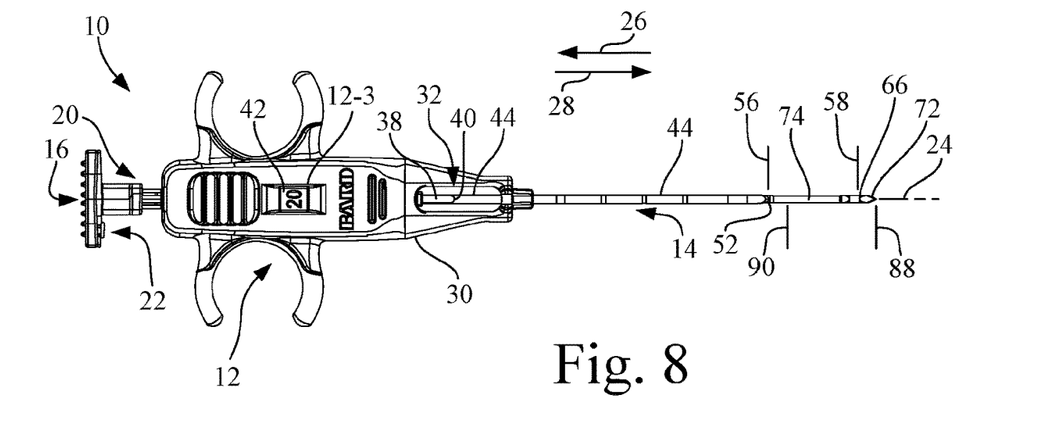
FIG. 8 is a top view of the biopsy apparatus of FIG. 1 with the cutting cannula of the cannula assembly in its retracted position and with the stylet of the stylet assembly in its extended position to thereby expose the sample notch of the stylet.

Referring also to FIGS. 6-8, cutting cannula 44, as well as the entirety of cannula assembly 14, is movable between a first axial position 56 and a second axial position 58.

Referring to FIG. 6, second axial position 58 corresponds to the length indicia "0", i.e., the fully extended position of cannula assembly 14, as viewed through length window 12-3 of housing 12. In the present embodiment, second axial position 58 also represents a fired, i.e., de-primed, state of cannula assembly 14. For convenience, each of first axial position 56 and second axial position 58 of cannula assembly 14 is identified in FIGS. 6-8 by the position of distal cutting edge 52 of cutting cannula 44.

Referring to FIG. 6, when cutting cannula 44 is in the second axial position 58, then sample access port 54 of cutting cannula 44 is aligned (e.g., radially and longitudinally) with sample access window 32 of distal nose portion 30 of housing 12, wherein cannula assembly 14 having cutting cannula 44 is in the fired, or de-primed, state, as further depicted by the cutting length indicia "0" shown in length window 12-3 of housing 12.

Referring to FIG. 7, cutting cannula 44 is moved in proximal direction 26 to first axial position 56 from second axial position 58 by operation of operator mechanism 20, thereby arming firing mechanism 18 to thereby place biopsy apparatus 10 in the armed, i.e., primed, state. Cutting cannula 44 is moved in distal direction 28 from the first axial position 56 to the second axial position 58 by operation of firing mechanism 18 (see FIGS. 4 and 5).

Referring again to FIGS. 4 and 5, firing mechanism 18 is positioned in cavity 23 of housing 12. Firing mechanism 18 includes a latch 60 and a firing spring 62. Firing spring 62 is interposed between housing 12 and cannula hub 42. Latch 60 may be configured to include one or more latch members (two shown in FIG. 4) to define multiple cutting lengths, e.g., cutting length indicia "10" representing retraction length of 10 mm, and a cutting length indicia "20" representing retraction length of 20 mm, shown in FIG. 5. Latch 60 is configured, i.e., positioned and arranged, to engage cannula hub 42 so as to hold cutting cannula 44 in the first axial position 56, i.e., in an armed state, wherein firing spring 62 is compressed. In the present example, as shown in FIGS. 7 and 8, first axial position 56 corresponds to a retraction of distal cutting edge 52 of cutting cannula 44 of cannula assembly 14 a distance of 20 mm, as shown in length window 12-3 of housing 12. Stated differently (with reference again to FIGS. 4 and 5), latch 60 is positioned and arranged to engage cannula hub 42 to hold cannula assembly 14 in an armed state, wherein cutting cannula 44 is in the first axial position 56 and firing spring 62 is compressed.

Referring to FIG. 4, a portion of operator mechanism 20 is slidably movable in second proximal aperture 12-2 of housing 12 in a direction substantially parallel to longitudinal axis 24. Operator mechanism 20 is configured, i.e., positioned and arranged, to effect an axial translation of cannula hub 42 in proximal direction 26, wherein the axial translation of cannula hub 42 causes firing spring 62 of firing mechanism 18 to compress as cutting cannula 44 is moved from the second axial position 58 to the first axial position 56 (see FIGS. 6 and 7). Stated differently, operator mechanism 20 is constructed to effect simultaneous axial translation of stylet hub 64 and cannula hub 42 in proximal direction 26, wherein the axial translation of cannula hub 42 causes firing spring 62 of firing mechanism 18 to compress as cutting cannula 44 is moved from the second axial position 58 to the first axial position 56. Also, operator mechanism 20 is positioned and arranged to move in distal direction 28 to release latch 60 of firing mechanism 18, wherein firing spring 62 decompresses to effect a distal axial movement of cutting cannula 44 from the first axial position 56 to the second axial position 58.

In the present embodiment, with reference to FIGS. 1-5, stylet assembly 16 is movably coupled to each of operator mechanism 20, housing 12, and cutting cannula 44. Referring particularly to FIG. 2, stylet assembly 16 has a stylet hub 64 and a stylet 66. Stylet 66 may be, for example, in the form of a solid metal rod. Stylet 66 has an outer surface 66-1, a proximal portion 68, and a distal portion 70. Proximal portion 68 of stylet 66 is affixed, e.g., by overmolding, press fit and/or adhesive, to stylet hub 64. Distal portion 70 of stylet 66 has a distal tip 72 and a sample notch 74 that is proximal to distal tip 72.

As best shown in FIG. 4, a bore 20-1 of operator mechanism 20, first proximal aperture 12-1 of housing 12, proximal axial opening 34 of housing 12, distal axial opening 36 of housing 12, and lumen 48 of cutting cannula 44 form a continuous through-path on longitudinal axis 24 for slidably and rotatably receiving and carrying stylet 66. As such, stylet 66 of stylet assembly 16 is configured, i.e., in size and shape, to be axially and rotatably received in each of bore 20-1 of operator mechanism 20, first proximal aperture 12-1 of housing 12, proximal axial opening 34 of housing 12, distal axial opening 36 of housing 12, and lumen 48 of cutting cannula 44. As such, stylet 66 is coaxial with cutting cannula 44 around and along longitudinal axis 24. Stylet 66 is axially and rotationally movable, e.g., positionable, in lumen 48 of cutting cannula 44. Accordingly, stylet hub 64 (along with stylet 66) is axially and rotationally movable, e.g., positionable, relative to longitudinal axis 24 and cutting cannula 44, and is axially and rotationally movable, e.g., positionable, relative to housing 12 and operator mechanism 20.

Figure 9:
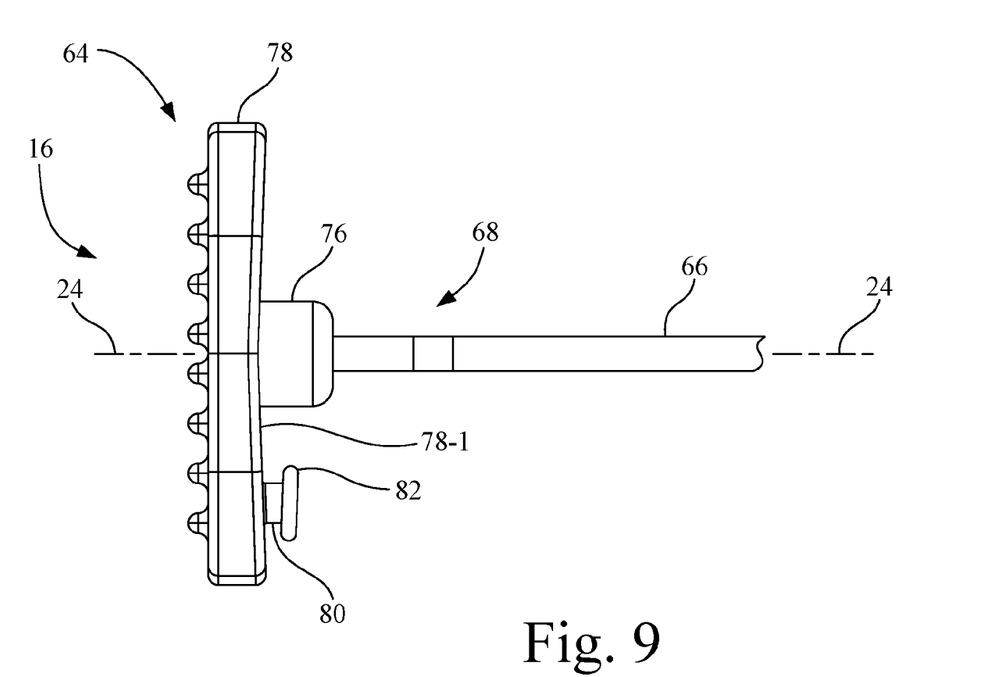
FIG. 9 is an enlarged top view of the stylet hub of the stylet assembly of the biopsy apparatus of FIG. 1.

In the present embodiment, with reference to FIGS. 2 and 9, stylet hub 64 is a single piece unitary structure, e.g., molded plastic, having a body 76, an end plate 78, a post 80, and an engagement member 82, wherein post 80 is interposed between end plate 78 and engagement member 82. In the present embodiment, end plate 78 has distal surface 78-1 having a slight concave contour. End plate 78 extends (e.g., in a direction perpendicular to longitudinal axis 24) beyond the radial extent of body 76. Body 76 is affixed, e.g., by overmolding, press fit and/or adhesive, to proximal portion 68 of stylet 66.

Figure 1:
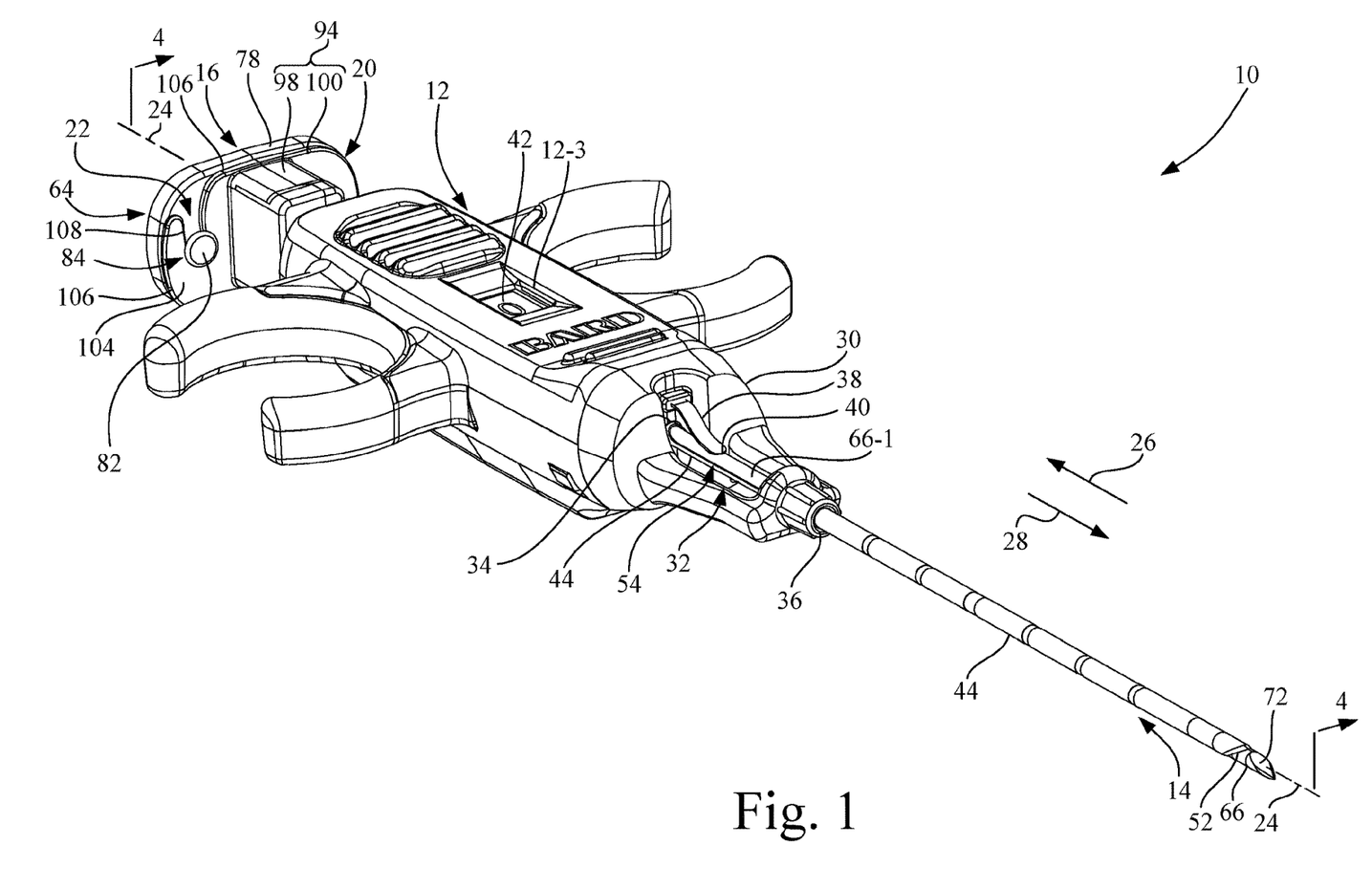
FIG. 1 is a perspective view of a biopsy apparatus with each of a stylet assembly and a cannula assembly in its respective fully extended position, and showing a connection mechanism formed by the stylet assembly and an operator mechanism, and also showing a sample removal finger, in accordance with aspects of the present invention.
Figure 11:
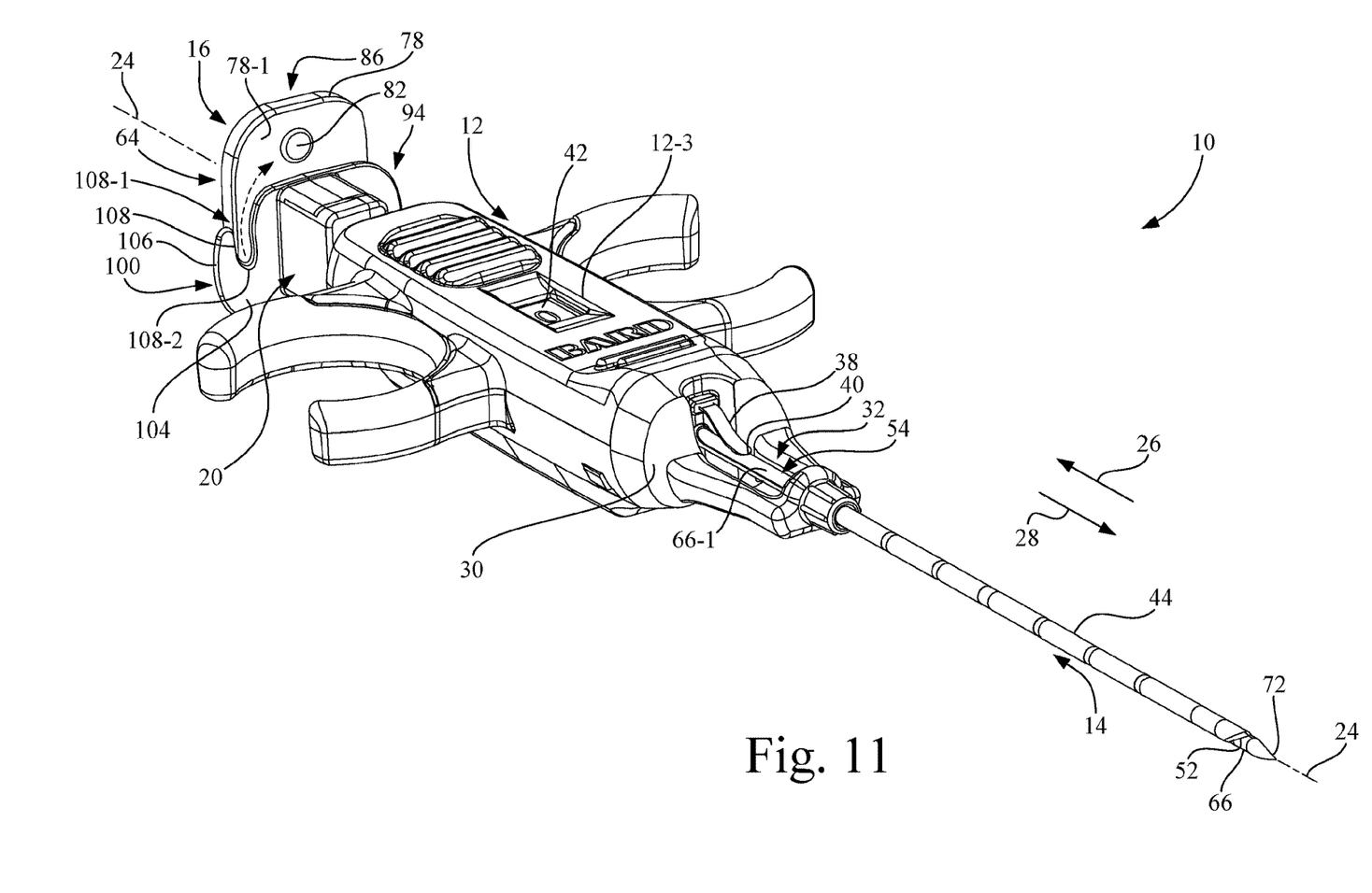
FIG. 11 is a perspective view of the biopsy apparatus of FIG. 1, with stylet hub of the stylet assembly disengaged from the head portion of the operator mechanism.

Referring to FIGS. 1 and 11, stylet hub 64 is constructed to be rotationally movable about longitudinal axis 24 between an engaged position 84 (FIG. 1) and a disengaged position 86 (FIG. 11), wherein stylet 66 serves as an axle (see also FIGS. 2 and 3) that rotates in lumen 48 of cutting cannula 44 for rotation about longitudinal axis 24.

Also, referring to FIGS. 6-8 and 12, stylet assembly 16, and thus stylet hub 64 and stylet 66, is configured to axially transition between an extended position 88, retracted position 90, and a sample retrieval position 92 relative to housing 12. For convenience, each of extended position 88, retracted position 90, and a sample retrieval position 92 of stylet assembly 16 is identified by the position distal tip 72 of stylet 66 of stylet assembly 16. In the present embodiment, sample retrieval position 92 is proximal to retracted position 90, and retracted position 90 is proximal to extended position 88.

Figure 12:
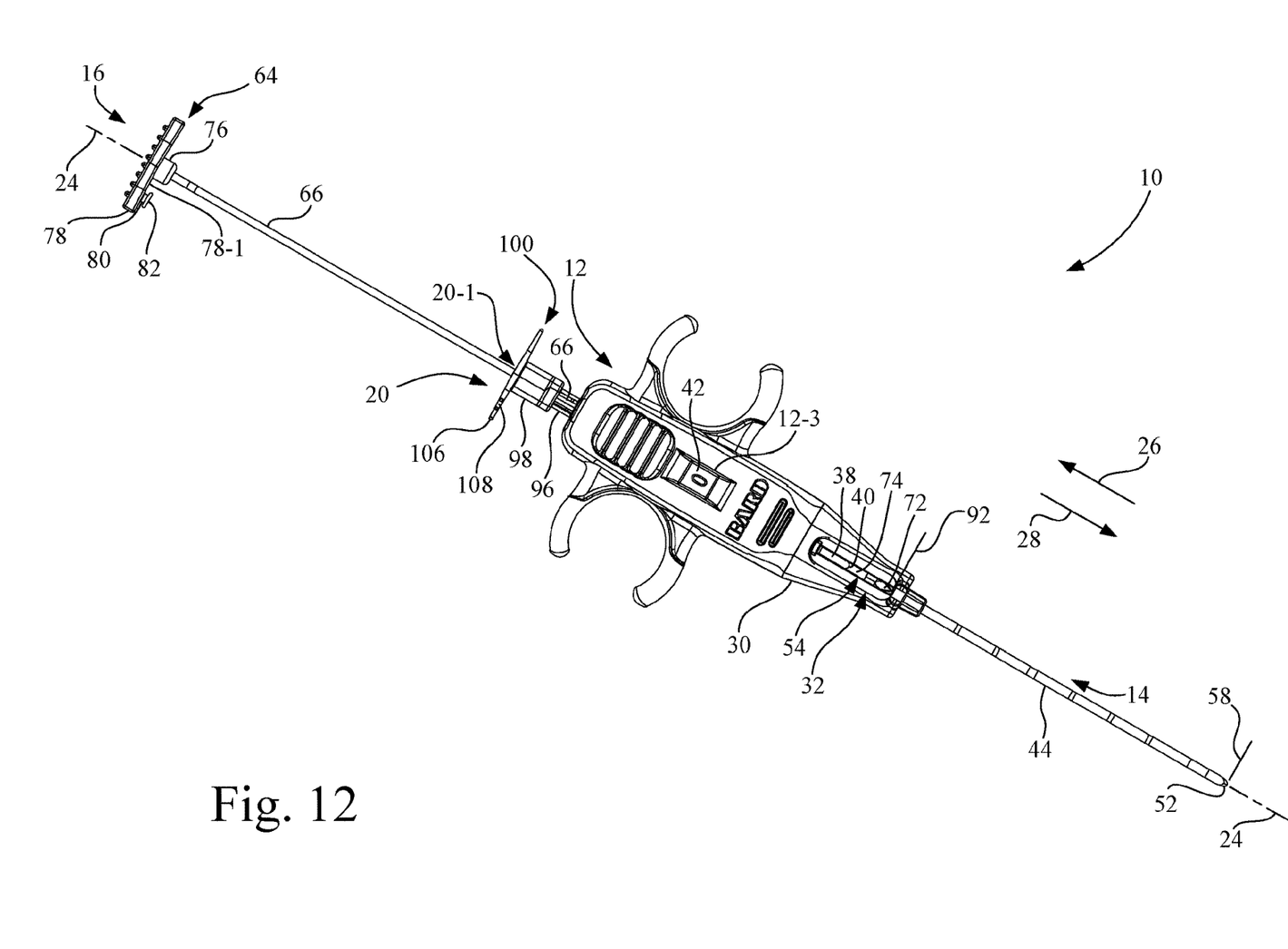
FIG. 12 is a top view of the biopsy apparatus of FIG. 1, with stylet hub and stylet of the stylet assembly retracted to a sample retrieval position.

Referring to FIG. 12, when stylet 66 is in sample retrieval position 92 and cutting cannula 44 is in the second axial position 58, sample notch 74 of stylet 66 is aligned (e.g., radially and at least partially longitudinally) with sample access port 54 of cutting cannula 44.

In the present embodiment, operator mechanism 20 is a single piece unitary structure, e.g., molded plastic, having a head portion 94 and an arm member 96, wherein arm member 96 extends distally from head portion 94. Arm member 96 is slidably movable in second proximal aperture 12-2 of housing 12. In the present embodiment, head portion 94 has a proximal surface 94-1, e.g., having a slight convex contour. A curvature of proximal surface 94-1 of head portion 94 of operator mechanism 20 corresponds to the curvature of distal surface 78-1 of end plate 78 of stylet hub 64 of stylet assembly 16. It is also contemplated that the respective surface contours of proximal surface 94-1 of head portion 94 of operator mechanism 20 and distal surface 78-1 of end plate 78 of stylet hub 64 of stylet assembly 16 may have other complementary shapes, such as for example, flat.

Referring to FIG. 4, head portion 94 of operator mechanism 20 further includes bore 20-1 that longitudinally extends through head portion 94, and which is sized and shaped to slidably receive stylet 66 of stylet assembly 16. As such, bore 20-1 of operator mechanism 20, first proximal aperture 12-1 of housing 12, proximal axial opening 34 of housing 12, distal axial opening 36 of housing 12, and lumen 48 of cutting cannula 44 form a continuous through-path for axially and rotatably receiving and carrying stylet 66 of stylet assembly 16 on longitudinal axis 24.

Referring to FIG. 7, operator mechanism 20 is configured, e.g., positioned and arranged, to effect axial movement of stylet hub 64 and cannula hub 42 in proximal direction 26. Head portion 94 is configured, e.g., positioned and arranged, to releasably engage stylet hub 64 and arm member 96 is configured, e.g., with a hook member, to releasably engage cannula hub 42 when operator mechanism 20 is moved in proximal direction 26. However, regardless of the rotational position of stylet hub 64 relative to head portion 94 of operator mechanism 20, head portion 94 of operator mechanism 20 is capable of axial engagement with engagement member 82 of stylet hub 64, e.g., to facilitate a limited longitudinal translation of stylet assembly 16 along longitudinal axis 24 from extended position 88 to a retracted position 90 in proximal direction 26.

Figure 10:
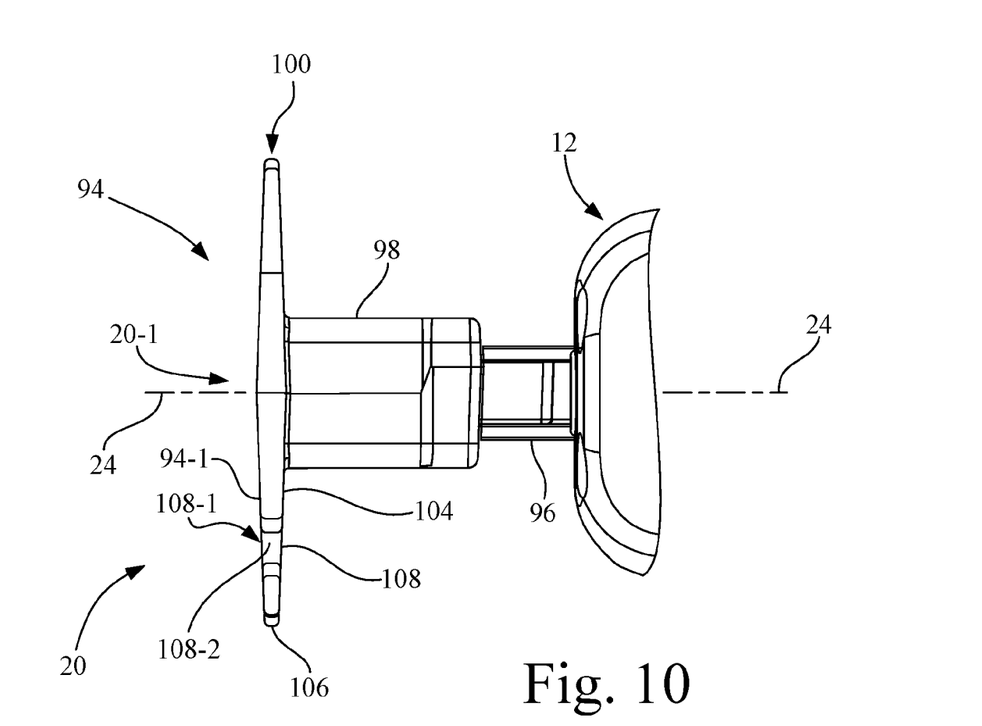
FIG. 10 is an enlarged top view of the head portion of the operator mechanism of the biopsy apparatus of FIG. 1.

Referring to FIGS. 2 and 10, head portion 94 of operator mechanism 20 includes a body 98 and an end wall 100. End wall 100 of head portion 94 includes proximal surface 94-1, a distal surface 104, and a perimeter edge 106. In the present embodiment, end wall 100 is a plate that radially extends beyond the radial extent of body 98. Perimeter edge 106 longitudinally extends between proximal surface 94-1 and distal surface 104. Referring also to FIGS. 1 and 11, end wall 100 has a channel 108, e.g., a slot, having an open end 108-1 and a closed end 108-2, wherein open end 108-1 is adjacent to perimeter edge 106.

Referring to FIGS. 1 and 9-11, channel 108 of end wall 100 of head portion 94 of operator mechanism 20 is configured, e.g., in size and shape, to receive post 80 of stylet hub 64 when stylet hub 64 is rotated to an engaged position 84. Referring particularly to FIGS. 9-11, channel 108 has an elongate extent that begins at open end 108-1 and extends from perimeter edge 106 into an interior of end wall 100 to terminate at closed end 108-2, and the elongate extent also extends from proximal surface 94-1 to distal surface 104. Channel 108 of end wall 100 of head portion 94 of operator mechanism 20 is configured, e.g., in size and shape, to receive post 80 of stylet hub 64 when stylet hub 64 is rotated to engaged position 84.

Referring to FIG. 1, when stylet hub 64 is in engaged position 84, then stylet hub 64 is releasably connected to head portion 94 of operator mechanism 20. For example, referring also to FIGS. 2 and 9-10, in the present embodiment, when stylet hub 64 is in engaged position 84 depicted in FIG. 1, then post 80 of stylet hub 64 is received in channel 108 of head portion 94 of operator mechanism 20, and end wall 100 of head portion 94 of operator mechanism 20 is received between end plate 78 and engagement member 82 of stylet hub 64. Stated differently, when stylet hub 64 is in engaged position 84, then engagement member 82 of stylet hub 64 is positioned to axially engage distal surface 104 of end wall 100 of head portion 94 of operator mechanism 20. Accordingly, stylet assembly 16 and operator mechanism 20 are axially (longitudinally) locked together when stylet hub 64 is in engaged position 84. When locked together, biopsy apparatus 10 is operable in a single insertion single sample mode (SISS) biopsy mode.

However, referring to FIG. 11, when stylet hub 64 is in disengaged position 86, then stylet hub 64 is disconnected from head portion 94 of operator mechanism 20 to facilitate axial movement of stylet assembly 16 in a proximal direction 26 independent of operator mechanism 20, as depicted in FIG. 12. For example, referring also to FIGS. 2 and 9-10, in the present embodiment, when stylet hub 64 is rotated to the disengaged position 86 depicted in FIG. 11, then post 80 of stylet hub 64 rotationally exits channel 108 of head portion 94 of operator mechanism 20, and end wall 100 of head portion 94 of operator mechanism 20 is no longer located between end plate 78 and engagement member 82 of stylet hub 64.

Accordingly, when stylet hub 64 is in disengaged position 86, stylet assembly 16 and operator mechanism 20 are no longer locked together, and biopsy apparatus 10 is operable in a single insertion multiple sample (SIMS) biopsy mode. In the SIMS mode, biopsy apparatus 10 is capable of extracting multiple biopsy samples from the patient without removing cutting cannula 44 from the patient.

For example, when stylet hub 64 is in disengaged position 86 depicted in FIG. 11, stylet assembly 16 is free to move axially in proximal direction 26 independent of operator mechanism 20 and cannula assembly 14 as depicted in FIG. 12. Stated differently, when stylet hub 64 is in disengaged position 86, then stylet hub 64 and stylet 66 (e.g., the entirety of stylet assembly 16) are axially movable in proximal direction 26 without moving either of operator mechanism 20 or cannula assembly 14. In the present embodiment, stylet assembly 16 is constructed such that stylet hub 64 must be in disengaged position 86 in order for stylet assembly 16 to be axially movable to sample retrieval position 92.

Referring to FIG. 11, with stylet hub 64 in disengaged position 86, stylet assembly 16 may be moved axially toward sample retrieval position 92 by the user pulling on stylet hub 64 in proximal direction 26 (see also FIG. 12). Sample removal finger 38 is configured (e.g., in position, size and shape) to extend in a cantilever manner from housing 12 toward stylet 66, with free end 40 of sample removal finger 38 constructed (e.g., in position, size and shape) to contact outer surface 66-1 of stylet 66. For example, sample removal finger 38 may form a leaf spring that is self-biasing in a direction toward stylet 66 so that free end 40 of sample removal finger 38 follows the contour of outer surface 66-1 of stylet 66 to enter and engage sample notch 74 as stylet 66 is retracted toward sample retrieval position 92. Stated differently, as stylet 66 is retracted in proximal direction 26, sample removal finger 38 rides along outer surface 66-1 of stylet 66, such that free end 40 of sample removal finger 38 will then enter and engage sample notch 74 of stylet 66 to dislodge and lift any tissue present in sample notch 74.

As shown in FIG. 12, when stylet 66 is in sample retrieval position 92 and cutting cannula 44 is in the second axial position 58, then sample notch 74 of stylet 66 is aligned (e.g., radially and at least partially longitudinally) with sample access port 54 of cutting cannula 44, so as to facilitate removal of a tissue sample from sample notch 74 of stylet 66 through sample access port 54 of cutting cannula 44. In the present embodiment, when cutting cannula 44 is in the second axial position 58 and stylet 66 is in sample retrieval position 92, then each of sample access port 54 of cutting cannula 44 and sample notch 74 of stylet 66 is aligned (e.g., radially and at least partially longitudinally) with sample access window 32 of housing 12, so as to facilitate removal of a tissue sample from sample notch 74 of stylet 66 through sample access window 32 of housing 12.

The process of operating biopsy apparatus 10 will now be described in the sequence of FIGS. 6-8, 11, and 12.

With reference to FIG. 6, biopsy apparatus 10 is shown in a "fired", i.e., de-primed, state, with each of cannula assembly 14 and stylet assembly 16 in its respective fully extended position. For example, as shown in FIG. 6, cutting cannula 44 of cannula assembly 14 is in second axial position 58 and stylet 66 of stylet assembly 16 is in extended position 88. Biopsy apparatus 10 is ready to be armed, i.e., primed, wherein the armed state is depicted in FIG. 7. Stylet 66 and cutting cannula 44 of biopsy apparatus 10 may be inserted, in unison, into a patient, either before or after placing biopsy apparatus 10 in the armed state.

With reference to FIG. 7, biopsy apparatus 10 is shown in the armed, i.e., primed, state, with each of cannula assembly 14 and stylet assembly 16 in its respective retracted position. For example, as depicted in FIG. 7, cutting cannula 44 of cannula assembly 14 is in first axial position 56 and stylet 66 of stylet assembly 16 is in retracted position 90. To achieve the armed, i.e., primed, state depicted in FIG. 7, operator mechanism 20 is moved in proximal direction 26 to simultaneously move cannula assembly 14 to first axial position 56 and to move stylet assembly to retracted position 90. Referring also to FIGS. 4 and 5, when in the armed state, cannula hub 42 attached to cutting cannula 44 is latched by latch 60, such that cutting cannula 44 is held in first axial position 56 and firing spring 62 is compressed. Stylet 66 of biopsy apparatus 10 is now ready to be positioned to take a biopsy sample.

With cutting cannula 44 of cannula assembly 14 in first axial position 56 and stylet 66 of stylet assembly 16 in retracted position 90 as a result of biopsy apparatus 10 being in the armed state depicted in FIG. 7, thereafter, operator mechanism 20 and stylet assembly 16 may then be moved in unison in distal direction 28 until stylet 66 is fully extended, e.g., in extended position 88, thereby exposing sample notch 74 of stylet 66, as depicted in FIG. 8. Stated differently, the user may depress stylet hub 64 to in turn slide both of stylet assembly 16 and operator mechanism 20 forward in distal direction 28, which in turn slides stylet 66 in distal direction 28 relative to cutting cannula 44 to expose sample notch 74 of stylet 66 beyond distal cutting edge 52 of cutting cannula 44. Tissue in the region of sample notch 74 may then prolapse into sample notch 74. Biopsy apparatus 10 is now ready to be fired to sever a tissue sample.

A further slight forward (distal) movement (e.g., 1 mm) of operator mechanism 20 moves arm member 96 in distal direction 28 to release latch 60 of firing mechanism 18, so as to fire biopsy apparatus 10, wherein firing spring 62 is released from the armed state to propel cutting cannula 44 forward to move over sample notch 74 of stylet 66, so as to sever any tissue in sample notch 74 of stylet 66. Biopsy apparatus 10 has now returned to the fired, i.e., de-primed, state depicted in FIG. 6.

In either of the SISS mode or the SIMS mode of operating biopsy apparatus 10, the tissue sample in sample notch 74 of stylet 66 now may be retrieved through sample access window 32 of housing 12 as follows.

Referring now also to FIG. 11, stylet hub 64 is then rotated to the disengaged position 86 (if not already). Thereafter, with reference also to FIG. 12, the user moves stylet assembly 16 axially in proximal direction 26, and rotationally as needed, until sample notch 74 of stylet 66 is positioned in alignment (e.g., radially and at least partially longitudinally) with sample access port 54 of cutting cannula 44 at sample access window 32 of housing 12. The tissue sample may then be removed from sample notch 74 of stylet 66 through sample access port 54 of cutting cannula 44 and sample access window 32 of housing 12. To aid in tissue removal, free end 40 of sample removal finger 38 follows the contour of outer surface 66-1 of stylet 66 to enter and engage the issue sample in sample notch 74 as stylet 66 is retracted toward sample retrieval position 92 so as to dislodge and lift the tissue sample from sample notch 74.

In some embodiments, stylet assembly 16 may be further axially moved in proximal direction 26 so that an entirety of stylet 66 is removed from operator mechanism 20. For example, in some situations or procedures it may be desirable and/or advantageous to fully remove stylet assembly 16 from biopsy apparatus 10, e.g., so as to facilitate cleaning or replacement of stylet assembly 16 (e.g., in a SIMS mode) during a biopsy procedure. However, optionally, operator mechanism 20 may include a catch feature located in or adjacent first proximal aperture 12-1 of housing 12, or in or adjacent bore 20-1 of operator mechanism 20, that is positioned to engage the distal end of sample notch 74 of stylet 66, thereby resisting complete removal of stylet assembly from operator mechanism 20.

In the SISS mode of operation, the entirety of biopsy apparatus 10 now may be removed from the patient. In the SISS mode, the user may defer the proximal retraction of stylet 66 of stylet assembly 16 to sample retrieval position 92 until after the entirety of biopsy apparatus 10 is removed from the patient, if desired.

However, in the SIMS mode of operation of biopsy apparatus 10, e.g., wherein one or more additional tissue samples is desired while cutting cannula 44 remains in the patient, then stylet assembly 16 may be returned to extended position 88 to reposition the components of biopsy apparatus 10 in the fired, i.e., de-primed, state depicted in FIG. 6. Thereafter, operator mechanism 20 may be moved in proximal direction 26 to simultaneously move cannula assembly 14 to first axial position 56 and to move stylet assembly 16 to retracted position 90 to achieve the armed, or primed, state, as depicted in FIG. 7. Referring also to FIGS. 4 and 5, when armed, cutting cannula 44 is latched in first axial position 56 and firing spring 62 is compressed, so as to achieve the armed state.

Operator mechanism 20 and stylet assembly 16 may then be slid forward in distal direction 28, which in turn slides stylet 66 in distal direction 28 relative to cutting cannula 44 to expose sample notch 74 of stylet 66 beyond distal cutting edge 52 of cutting cannula 44, as depicted in FIG. 8, and tissue again may prolapse into sample notch 74. A further slight forward (distal) movement of operator mechanism 20 fires, i.e., releases, firing spring 62 from the armed state to propel cutting cannula 44 forward to move over sample notch 74 of stylet 66, so as to sever any tissue in sample notch 74 of stylet 66, to again achieve the fired, i.e., de-primed, state depicted in FIG. 6. Stylet hub 64 may then be rotated to the disengaged position 86 as depicted in FIG. 11 (if not already), and then, as depicted in FIG. 12, the user moves stylet assembly 16 axially in proximal direction 26, and rotationally as needed, until sample notch 74 of stylet 66 is positioned in alignment (e.g., radially and at least partially longitudinally) with sample access port 54 of cutting cannula 44 at sample access window 32 of housing 12. The present tissue sample may then be removed from sample notch 74 of stylet 66 through sample access port 54 of cutting cannula 44 and sample access window 32 of housing 12, as described above.

If further samples are desired, then the operational process described above may be repeated again.

The following items also relate to the invention:

In one form, the invention relates to a biopsy apparatus that includes a housing, a cannula assembly, a stylet assembly, a firing mechanism, and an operator mechanism. The housing has a cavity and is configured to define (defines) a longitudinal axis. The cannula assembly is movably coupled to the housing and may comprise a cutting cannula. The cannula assembly has a cannula hub affixed to a cutting cannula. The cutting cannula has a lumen arranged on (along) the longitudinal axis. The stylet assembly is movably coupled to the housing. The stylet assembly has a stylet hub and a stylet. The stylet is coaxial with the cutting cannula. The stylet has a proximal portion and a distal portion. The proximal portion is affixed to the stylet hub. The distal portion has a distal tip and a sample notch proximal to the distal tip. The stylet hub is (configured to be) axially and rotationally movable relative to the longitudinal axis. The firing mechanism has a latch and a firing spring. The firing spring and the cannula hub are positioned in the cavity of the housing. The latch is configured to engage the cannula hub to hold the cutting cannula in a first axial position. The operator mechanism is configured to effect axial movement of the stylet hub and the cannula hub. The operator mechanism has a head portion and an arm member, wherein the arm member extends distally from the head portion. The head portion is configured to releasably engage the stylet hub and the arm member is configured to releasably engage the cannula hub. The stylet hub is configured to be rotationally movable between an engaged position and a disengaged position. The stylet hub (operator mechanism/apparatus) is configured such that when the stylet hub is in the engaged position, the stylet hub is releasably connected to the head portion of the operator mechanism. The stylet hub is configured such that when the stylet hub is in the disengaged position, the stylet hub is disconnected from the head portion of the operator mechanism to facilitate axial movement of the stylet assembly in a proximal direction independent of the operator mechanism.

In accordance with any of the embodiments of the invention, the apparatus may be configured such that when the stylet hub is in the disengaged position, the stylet hub and stylet are axially movable in the proximal direction without moving either of the operator mechanism or the cannula assembly.

In accordance with some of the embodiments of the invention, the stylet hub may have an end plate, a post, and an engagement member, wherein the post is interposed between the end plate and the engagement member. The head portion of the operator mechanism may have an end wall having a proximal surface, a distal surface, and a perimeter edge. The perimeter edge is configured to extend (extends) between the proximal surface and the distal surface. The end wall may have a channel having an open end and a closed end, wherein the open end is adjacent to the perimeter edge. The channel of the end wall of the head portion of the operator mechanism (the operator mechanism/apparatus) may be configured to receive the post of the stylet hub when the stylet hub is rotated to the engaged position, and may be configured such that the engagement member is positioned to axially engage the distal surface of the end wall of the head portion of the operator mechanism when the stylet hub is in the engaged position.

In accordance with any of the embodiments of the invention, the stylet assembly (apparatus) may be configured to axially transition between a retracted position, an extended position, and a sample retrieval position relative to the housing. The stylet assembly may be configured such that the stylet hub must be in the disengaged position in order for the stylet assembly to be axially movable to the sample retrieval position.

In accordance with the embodiment of the preceding paragraph, the sample retrieval position may be (is) proximal to the retracted position, and the retracted position may be (is) proximal to the extended position.

In accordance with any of the embodiments of the invention, the cutting cannula may include a cannula wall and a cannula portion having a sample access port through the cannula wall that is in fluid communication with the lumen of the cutting cannula. The cutting cannula may have a second axial position that is distal to the first axial position. The biopsy apparatus may be configured such that when the cutting cannula is in the second axial position and the stylet is in the sample retrieval position, the sample notch of the stylet may be radially aligned with the sample access port of the cutting cannula.

In accordance with some of the embodiments of the invention, the housing may include a sample access window. The biopsy apparatus may be configured such that when the cutting cannula is in the second axial position and the stylet is in the sample retrieval position, each of the sample access port of the cutting cannula and the sample notch of the stylet may be radially aligned with the sample access window of the housing to facilitate removal of a tissue sample from the sample notch of the stylet.

Optionally, in accordance with some of the embodiments of the invention, a sample removal finger may be connected to the housing. The (apparatus may be configured such that the) sample removal finger may (be configured to) extend in a cantilever manner from the housing in the sample access window. The sample removal finger has a free end, wherein the free end of the sample removal finger (apparatus) may be configured to contact an outer surface of the stylet.

Optionally, in accordance with some of the embodiments of the invention, a sample removal finger may be connected to the housing, wherein the sample removal finger (apparatus) may be configured to engage the sample notch of the stylet when the stylet is retracted.

Optionally, in accordance with some of the embodiments of the invention, a sample removal finger may be connected to the housing. The (apparatus may be configured such that the) sample removal finger may (be configured to) extend in a cantilever manner from the housing toward the stylet, wherein a free end of the sample removal finger may (be configured to) contact an outer surface of the stylet. The (apparatus may be configured such that the) sample removal finger may (be configured to) be self-biasing in a direction toward the stylet so that the free end of the sample removal finger follows the outer surface of the stylet into the sample notch as the stylet is retracted toward the sample retrieval position.

In another form, the invention relates to a biopsy apparatus that includes a housing having a sample access window. A sample removal finger is connected to the housing. The (apparatus may be configured such that the) sample removal finger may (be configured to) extend in a cantilever manner from the housing in the sample access window. The sample removal finger has a free end. A cannula assembly is movably coupled to the housing and may comprise a cutting cannula. The cannula assembly has a cannula hub affixed to a cutting cannula. The cutting cannula has a sample access port and a distal cutting edge. The cutting cannula (may extend along and) defines a longitudinal axis. The (apparatus may be configured such that the) cutting cannula is positioned to distally extend from the housing. The cannula assembly is configured to axially transition between a first axial position and a second axial position. A stylet assembly is movably coupled to the housing. The stylet assembly is configured to axially transition between a retracted position, an extended position, and a sample retrieval position. The stylet assembly may have a stylet and has a stylet hub affixed to the stylet. The stylet is coaxial with the cutting cannula. The stylet has a distal tip and a sample notch proximal to the distal tip. The (apparatus may be configured such that the) stylet is positioned wherein the free end of the sample removal finger extends through the sample access port of the cutting cannula to contact an outer surface of the stylet. (The apparatus may be configured such that) (An) operator mechanism is configured to effect axial movement of the stylet hub and the cannula hub. The operator mechanism has a head portion and an arm member, wherein the arm member extends distally from the head portion. The (apparatus may be configured such that the) head portion is configured to releasably engage the stylet hub and the arm member is configured to releasably engage the cannula hub. The stylet hub (operator mechanism/apparatus) is configured to be rotationally movable relative to the head portion of the operator mechanism between an engaged position and a disengaged position.

In accordance with some of the embodiments of the invention, the stylet assembly (apparatus) may be configured so that the stylet hub is releasably connected to the head portion of the operator mechanism when the stylet hub is in the engaged position. The stylet assembly (apparatus) may be configured such that the stylet hub is disconnected from the head portion of the operator mechanism when the stylet hub is in the disengaged position, so as to facilitate axial movement of the stylet assembly in a proximal direction to the sample retrieval position independent of the operator mechanism.

In accordance with any of the embodiments of the invention, the stylet assembly (apparatus) may be configured such that when the stylet hub is in the disengaged position, the stylet hub and stylet are axially movable in the proximal direction without moving either of the operator mechanism or the cannula assembly.

In accordance with some of the embodiments of the invention, the stylet hub may have an end plate, a post, and an engagement member, wherein the post is interposed between the end plate and the engagement member. The head portion of the operator mechanism may have an end wall having a proximal surface, a distal surface, and a perimeter edge. The perimeter edge may be configured to extend (extends) between the proximal surface and the distal surface. The end wall may have a channel having an open end and a closed end, wherein the open end is adjacent to the perimeter edge. The channel of the end wall of the head portion of the operator mechanism (the operator mechanism/apparatus) may be configured to receive the post of the stylet hub when the stylet hub is rotated to the engaged position. The engagement member is (configured to be) positioned to axially engage the distal surface of the end wall of the head portion of the operator mechanism when the stylet hub is in the engaged position.

In accordance with any of the embodiments of the invention of paragraphs 0077-0080, the sample retrieval position may be (is) proximal to the retracted position, and the retracted position may be (is) proximal to the extended position. (The apparatus may be configured such that the) (The) stylet hub may (be configured to) disengage from the head portion of the operator mechanism when the stylet hub is rotated from the engaged position to the disengaged position such that the stylet assembly is axially moveable independent of the cannula assembly so as to facilitate axial movement of the stylet to the sample retrieval position.

In accordance with any of the embodiments of the invention, the cutting cannula may include a lumen, and the stylet may be (is configured to be) located in the lumen. The biopsy apparatus may be configured such that when the cutting cannula is in the second axial position and the stylet is in the sample retrieval position, the sample notch of the stylet may be radially aligned with the sample access port of the cutting cannula at the sample access window of the housing.

In accordance with any of the embodiments of paragraphs 0077-0082, wherein the (apparatus may be configured such that the) sample removal finger may (be configured to) engage the sample notch of the stylet when the stylet is in the sample retrieval position.

In accordance with any of the embodiments of paragraphs 0077-0083, (the apparatus may be configured such that) the free end of the sample removal finger may be configured to be (is) in contact with a surface of the stylet so as to follow the surface of the stylet and to enter the sample notch as the stylet is retracted toward the sample retrieval position.

In accordance with any of the embodiments of paragraphs 0077-0084, the biopsy apparatus may further comprise a firing mechanism that may include a latch and a firing spring. The firing spring may be interposed between the housing and the cannula hub. The (apparatus may be configured such that the) latch may (be configured to) engage the cannula hub to hold the cannula assembly in an armed state wherein the cutting cannula is in the first axial position and the firing spring is compressed.

In accordance with any of the embodiments of the invention, the (apparatus may be configured such that the) operator mechanism may be configured to effect simultaneous axial translation of the stylet hub and the cannula hub in a proximal direction, wherein the axial translation of the cannula hub causes (is configured to cause) the firing spring of the firing mechanism to compress as the cutting cannula is moved (moves) from the second axial position to the first axial position.

In accordance with any of the embodiments of the invention, (the apparatus may be configured such that) the operator mechanism may be configured to move (moves) in a distal direction to release the latch of the firing mechanism, wherein the firing spring decompresses to effect a distal axial movement of the cutting cannula from the first axial position to the second axial position.

As used herein, the terms "substantially", "slightly", and other words of degree are relative modifiers intended to indicate permissible variation from the characteristic so modified. Such terms are not intended to be limited to the absolute value of the characteristic which it modifies, but rather possessing more of the physical or functional characteristic than the opposite, and approaching or approximating such a physical or functional characteristic.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A biopsy apparatus, comprising:
    a housing having a cavity and configured to define a longitudinal axis;
    a cannula assembly movably coupled to the housing, the cannula assembly having a cannula hub affixed to a cutting cannula, the cutting cannula having a lumen arranged on the longitudinal axis;
    a stylet assembly movably coupled to the housing, the stylet assembly having a stylet hub and a stylet, the stylet being coaxial with the cutting cannula, the stylet having a proximal portion and a distal portion, the proximal portion being affixed to the stylet hub, the distal portion having a distal tip and a sample notch proximal to the distal tip, the stylet hub configured to be axially and rotationally movable relative to the longitudinal axis;
    a firing mechanism having a latch and a firing spring, the firing spring and the cannula hub being positioned in the cavity of the housing, the latch configured to engage the cannula hub to hold the cutting cannula in a first axial position; and
    an operator mechanism configured to effect axial movement of the stylet hub and the cannula hub, the operator mechanism having a head portion and an arm member, wherein the arm member extends distally from the head portion, the head portion configured to releasably engage the stylet hub and the arm member configured to releasably engage the cannula hub,
    wherein the stylet hub is configured to be rotationally movable between an engaged position and a disengaged position, wherein in the engaged position the stylet hub is releasably connected to the head portion of the operator mechanism, and when the stylet hub is in the disengaged position, the stylet hub is disconnected from the head portion of the operator mechanism to facilitate axial movement of the stylet assembly in a proximal direction independent of the operator mechanism.

2. The biopsy apparatus according to claim 1, wherein when the stylet hub is in the disengaged position, the stylet hub and stylet are axially movable in the proximal direction without moving either of the operator mechanism or the cannula assembly.

3. The biopsy apparatus according to claim 1, wherein:
    the stylet hub has an end plate, a post, and an engagement member, wherein the post is interposed between the end plate and the engagement member;
    the head portion of the operator mechanism has an end wall having a proximal surface, a distal surface, and a perimeter edge, the perimeter edge extending between the proximal surface and the distal surface, the end wall having a channel having an open end and a closed end, wherein the open end is adjacent to the perimeter edge, and
    the channel of the end wall of the head portion of the operator mechanism is configured to receive the post of the stylet hub when the stylet hub is rotated to the engaged position, and wherein the engagement member is positioned to axially engage the distal surface of the end wall of the head portion of the operator mechanism when the stylet hub is in the engaged position.

4. The biopsy apparatus according to claim 1, wherein the stylet assembly is configured to axially transition between a retracted position, an extended position, and a sample retrieval position relative to the housing, the stylet assembly configured such that the stylet hub must be in the disengaged position in order for the stylet assembly to be axially movable to the sample retrieval position.

5. The biopsy apparatus according to claim 4, wherein the sample retrieval position is proximal to the retracted position, and the retracted position is proximal to the extended position.

6. The biopsy apparatus according to claim 4, wherein the cutting cannula includes a cannula wall and a cannula portion having a sample access port through the cannula wall that is in fluid communication with the lumen of the cutting cannula, and wherein the cutting cannula has a second axial position distal to the first axial position, and wherein when the cutting cannula is in the second axial position and the stylet is in the sample retrieval position, the sample notch of the stylet is radially aligned with the sample access port of the cutting cannula.

7. The biopsy apparatus according to claim 6, wherein the housing includes a sample access window, and wherein when the cutting cannula is in the second axial position and the stylet is in the sample retrieval position, each of the sample access port of the cutting cannula and the sample notch of the stylet is radially aligned with the sample access window of the housing to facilitate removal of a tissue sample from the sample notch of the stylet.

8. The biopsy apparatus according to claim 7, comprising a sample removal finger connected to the housing, the sample removal finger configured to extend in a cantilever manner from the housing into the sample access window, the sample removal finger having a free end, wherein the free end of the sample removal finger is configured to contact an outer surface of the stylet.

9. The biopsy apparatus according to claim 1, comprising a sample removal finger connected to the housing, the sample removal finger configured to engage the sample notch of the stylet when the stylet is retracted.

10. The biopsy apparatus according to claim 1, comprising a sample removal finger connected to the housing, the sample removal finger configured to extend in a cantilever manner from the housing toward the stylet, wherein a free end of the sample removal finger is configured to contact an outer surface of the stylet, the sample removal finger configured to be self-biasing in a direction toward the stylet so that the free end of the sample removal finger follows the outer surface of the stylet into the sample notch as the stylet is retracted toward a sample retrieval position.

11. A biopsy apparatus, comprising:
a housing having a sample access window;
a sample removal finger connected to the housing, the sample removal finger configured to extend in a cantilever manner from the housing into the sample access window, the sample removal finger having a free end;
a cannula assembly movably coupled to the housing, the cannula assembly having a cannula hub affixed to a cutting cannula, the cutting cannula having a sample access port and a distal cutting edge, the cutting cannula defining a longitudinal axis, the cutting cannula positioned to distally extend from the housing, the cannula assembly configured to axially transition between a first axial position and a second axial position;
a stylet assembly movably coupled to the housing, the stylet assembly configured to axially transition between a retracted position, an extended position, and a sample retrieval position, the stylet assembly having a stylet hub affixed to a stylet, the stylet being coaxial with the cutting cannula, the stylet having a distal tip and a sample notch proximal to the distal tip, the stylet being positioned wherein the free end of the sample removal finger extends through the sample access port of the cutting cannula to contact an outer surface of the stylet; and
an operator mechanism configured to effect axial movement of the stylet hub and the cannula hub, the operator mechanism having a head portion and an arm member, wherein the arm member extends distally from the head portion, the head portion configured to releasably engage the stylet hub and the arm member configured to releasably engage the cannula hub, and wherein the stylet hub is configured to be rotationally movable relative to the head portion of the operator mechanism between an engaged position and a disengaged position.

12. The biopsy apparatus according to claim 11, wherein:
the stylet assembly is configured so that the stylet hub is releasably connected to the head portion of the operator mechanism when the stylet hub is in the engaged position, and
the stylet assembly is configured such that the stylet hub is disconnected from the head portion of the operator mechanism when the stylet hub is in the disengaged position, so as to facilitate axial movement of the stylet assembly in a proximal direction to the sample retrieval position independent of the operator mechanism.

13. The biopsy apparatus according to claim 11, wherein the stylet assembly is configured such that when the stylet hub is in the disengaged position, the stylet hub and stylet are axially movable in the proximal direction without moving either of the operator mechanism or the cannula assembly.

14. The biopsy apparatus according to claim 11, wherein:
the stylet hub has an end plate, a post, and an engagement member, wherein the post is interposed between the end plate and the engagement member;
the head portion of the operator mechanism has an end wall having a proximal surface, a distal surface, and a perimeter edge, the perimeter edge extending between the proximal surface and the distal surface, the end wall having a channel having an open end and a closed end, wherein the open end is adjacent to the perimeter edge, and
the channel of the end wall of the head portion of the operator mechanism is configured to receive the post of the stylet hub when the stylet hub is rotated to the engaged position, and wherein the engagement member is positioned to axially engage the distal surface of the end wall of the head portion of the operator mechanism when the stylet hub is in the engaged position.

15. The biopsy apparatus according to claim 11, wherein:
the sample retrieval position is proximal to the retracted position, and the retracted position is proximal to the extended position, and
the stylet hub is configured to disengage from the head portion of the operator mechanism when the stylet hub is rotated from the engaged position to the disengaged position such that the stylet assembly is axially moveable independent of the cannula assembly so as to facilitate axial movement of the stylet to the sample retrieval position.

16. The biopsy apparatus according to claim 11, wherein the cutting cannula includes a lumen, and the stylet is located in the lumen, and wherein when the cutting cannula is in the second axial position and the stylet is in the sample retrieval position, the sample notch of the stylet is radially aligned with the sample access port of the cutting cannula at the sample access window of the housing.

17. The biopsy apparatus according to claim 11, wherein the sample removal finger is configured to engage the sample notch of the stylet when the stylet is in the sample retrieval position.

18. The biopsy apparatus according to claim 11, wherein the free end of the sample removal finger is in contact with a surface of the stylet so as to follow the surface of the stylet and to enter the sample notch as the stylet is retracted toward the sample retrieval position.

19. The biopsy apparatus according to claim 11, further comprising a firing mechanism that includes a latch and a firing spring, the firing spring being interposed between the housing and the cannula hub, the latch configured to engage the cannula hub to hold the cannula assembly in an armed state wherein the cutting cannula is in the first axial position and the firing spring is compressed.

20. The biopsy apparatus according to claim 19, the operator mechanism configured to effect simultaneous axial translation of the stylet hub and the cannula hub in a proximal direction, wherein the axial translation of the cannula hub causes the firing spring of the firing mechanism to compress as the cutting cannula is moved from the second axial position to the first axial position.

21. The biopsy apparatus according to claim 20, wherein the operator mechanism is configured to move in a distal direction to release the latch of the firing mechanism, wherein the firing spring decompresses to effect a distal axial movement of the cutting cannula from the first axial position to the second axial position.

* * * * *